United States Patent
Kido et al.

(10) Patent No.: US 7,670,412 B2
(45) Date of Patent: Mar. 2, 2010

(54) CANISTER

(75) Inventors: Katsuyuki Kido, Seto (JP); Ryuji Kosugi, Obu (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 263 days.

(21) Appl. No.: 11/833,419

(22) Filed: Aug. 3, 2007

(65) Prior Publication Data

US 2008/0028939 A1 Feb. 7, 2008

(30) Foreign Application Priority Data

Aug. 3, 2006 (JP) ............................. 2006-211900

(51) Int. Cl.
*B01D 53/04* (2006.01)
*F02M 33/04* (2006.01)
(52) U.S. Cl. ........................................ 96/147; 123/519
(58) Field of Classification Search ................ 96/108, 96/126, 147, 153; 123/518–520
See application file for complete search history.

(56) References Cited

U.S. PATENT DOCUMENTS 5,861,050 A * 1/1999 Pittel et al. .................... 95/115

| 2005/0188851 | A1* | 9/2005 | Yamazaki et al. | 96/153 |
| 2005/0223900 | A1* | 10/2005 | Yoshida et al. | 96/108 |
| 2005/0247202 | A1* | 11/2005 | Seki | 96/146 |
| 2006/0196480 | A1* | 9/2006 | Kosugi et al. | 123/516 |
| 2007/0101865 | A1* | 5/2007 | Kim et al. | 96/134 |

FOREIGN PATENT DOCUMENTS

| JP | 10339218 | 12/1998 |
| JP | 11152466 | 6/1999 |
| JP | 2000186635 | 4/2000 |
| JP | 2003311118 | 11/2003 |

* cited by examiner

*Primary Examiner*—Frank M Lawrence
(74) *Attorney, Agent, or Firm*—Marshall, Gerstein & Borun LLP (57) ABSTRACT

Inside of a first absorption chamber of a canister, a heat storage material container in which a heat storage material constituted of a material that is larger in thermal conductivity and higher in heat capacity than an absorber is accommodated is provided. Since the heat storage material is isolated from the absorber, a larger contact area of the absorber with vaporized fuel gas and air can be secured, and thereby the absorption capacity and desorption capacity of the absorber can be highly exerted. Accordingly, the heat storage material can inhibit the absorber from varying in temperature, the absorber can be prevented from deteriorating in absorption capacity, and the heat storage material can be prevented from deteriorating.

6 Claims, 6 Drawing Sheets

CANISTER

CROSS-REFERENCE TO RELATED APPLICATION

This application claims priority under 35 USC 119 from Japanese Patent Application No. 2006-211900, the disclosure of which is incorporated by reference herein.

BACKGROUND OF THE INVENTION

1. Field of the Invention

The present invention relates to a canister.

2. Description of the Related Art

As a canister that processes a vaporized fuel gas generated in a fuel tank, in JP-A No. 10-339218, a processor of vaporized fuel, which is provided with activated carbon absorber on a surface of which heat storage particles that are larger in the thermal conductivity and the heat capacity in comparison with that of the activated carbon are stuck, is described. In the configuration, when the vaporized fuel is absorbed, the activated carbon generates heat, the heat is transferred to the heat storage particles to suppress a temperature from rising, and thereby the absorption capacity is prevented from becoming lower.

However, in the configuration described in JP-A No. 10-339218, since the activated carbon (absorber) and heat storage particles are directly in contact with each other, an area through which the activated carbon comes into contact with the vaporized fuel gas and air becomes smaller. Accordingly, there is fear that the performance of the activated carbon may not be fully exerted. Furthermore, since the heat storage material as well directly comes into contact with the vaporized fuel gas and air, the performance thereof may be deteriorated.

SUMMARY OF THE INVENTION

In consideration of the above circumstances, the present invention is intended to obtain a canister in which a heat storage material can inhibit a temperature of an absorber from varying and that can prevent reduction in the absorption capacity of the absorber and deterioration of the heat storage material.

A canister according to a first aspect of the invention includes: a canister body in which vaporized fuel gas is introduced; an absorber that is accommodated in the canister body and absorbs the vaporized fuel gas; a heat storage material container disposed inside of the canister body; and a heat storage material accommodated in the heat storage material container.

In the canister, although the vaporized fuel gas introduced in the canister body is absorbed by an absorber, the temperature increase upon absorption can be suppressed by use of the heat storage material. Accordingly, the absorber is prevented from rising in temperature, and thereby the absorption capacity can be prevented from deteriorating.

Furthermore, the heat storage material container is disposed inside of the canister body, and the heat storage material is accommodated in the heat storage material container. That is, owing to the heat storage material container, the heat storage material and the absorber are separated, that is, these are not in direct contact. Accordingly, in comparison with a configuration where a heat storage material and an absorber directly come into contact, a larger contact area between the absorber and the vaporized fuel gas and air can be secured, and thereby the absorption capacity of the absorber can be highly exerted. Furthermore, since the heat storage material does not directly come into contact with the vaporized fuel gas and the air, the performance can be prevented from deteriorating.

In the canister of the first aspect of the invention, the heat storage material container may have the thermal conductivity higher than that of the absorber.

Thereby, the heat exchange rate between the absorber and heat storage material is rate-determined by the heat exchange rate between the absorbers. That is, in comparison with a configuration where the thermal conductivity of the heat storage material container is lower than that of the absorber, the heat exchange rate becomes higher.

In the canister of the first aspect of the invention, the heat storage material container may have the heat capacity larger than that of the absorber. That is, the heat storage material container may have the heat capacity larger than that of the absorber of an amount corresponding to a volume that the heat storage material container occupies.

Thereby, in comparison with a configuration where the heat storage material container is not disposed (where, in place of the heat storage material container, in that region, an absorber is present), the heat capacity becomes larger; accordingly, the temperature of the absorber can be effectively prevented from rising.

In the canister of the first aspect of the invention, the heat storage material container may form a closed curved surface outside of the accommodated heat storage material.

That is, in the canister of the first aspect of the invention, even if the heat storage material container has a configuration where the heat storage material container is partially opened and the heat storage material and the absorber locally and directly come into contact in the opened portion, the heat storage material does not come into contact directly with the absorber except in the opened portion; accordingly, the absorption capacity of the absorber can be highly exerted and the heat storage material can be prevented from deteriorating in performance. However, in particular, when the heat storage material container forms a closed curved surface outside of the heat storage material, the heat storage material and the absorber can be completely prevented from coming into contact directly with each other.

In the canister of the first aspect of the invention, the heat storage material container may be at least partially provided with a melting portion that melts at a temperature lower than a boiling temperature of the heat storage material.

Thereby, when the heat storage material container is incinerated, before a temperature of the heat storage material inside reaches the boiling temperature, the melting portion melts. Accordingly, at the time of incineration, the heat storage material container can be prevented from exploding.

In the canister of the first aspect of the invention, the heat storage material container may be formed so as to have a shape identical as that of the absorber.

Thereby, the heat storage material containers in which the heat storage material is accommodated can be evenly disposed over an entire region inside of the canister body; accordingly, the heat storage effect can be heightened.

Since the invention is thus configured, the heat storage material can inhibit the absorber from varying in the temperature and moreover reduction in the absorption capacity of the absorber and deterioration of the heat storage material can be prevented.

DETAILED DESCRIPTION OF THE INVENTION

Figure 1:
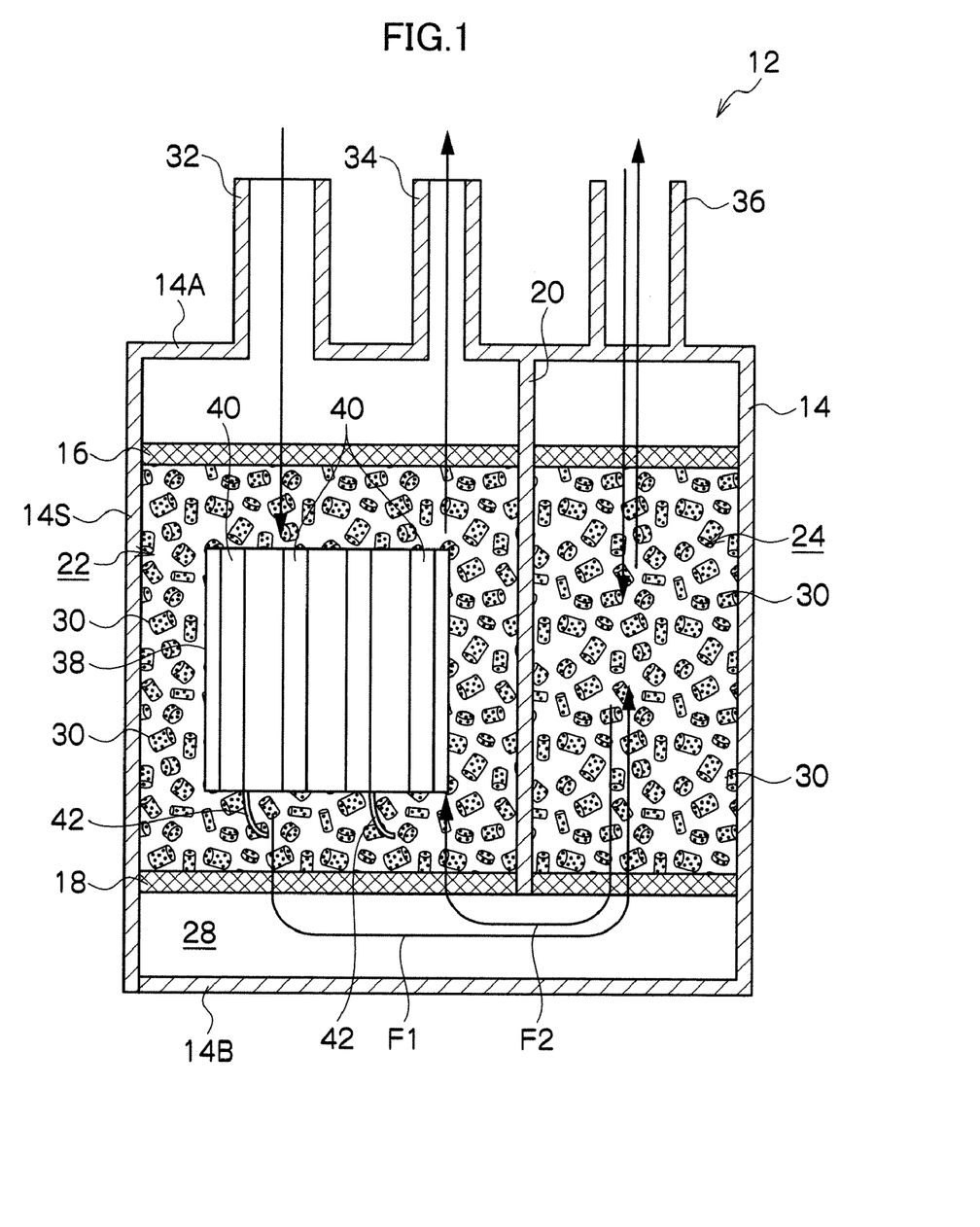
FIG. 1 is a sectional view showing a schematic configuration of a canister of a first embodiment of the invention.

In FIG. 1, a canister 12 of a first embodiment of the invention is shown. The canister 12 has a canister body 14 formed into a box shape. Inside of the canister body 14, in parallel with one end wall 14A and the other end wall 14B respectively, filter membranes 16 and 18 constituted of a non-woven fabric are disposed.

Furthermore, from the one end wall 14A of the canister body 14, a partition wall 20 reaching the filter membrane 18 is extended. With the partition wall 20 and the filter membranes 16, 18, inside of the canister body 14, a first absorption chamber 22 and a second absorption chamber 24 are constituted. A substantially U-shaped gas flow path including a direction F1 reaching from the first absorption chamber 22 through a space 28 between the filter membrane 18 and the other end wall 14B to the second absorption chamber 24 and a direction F2 opposite thereto is formed.

In the first absorption chamber 22 and the second absorption chamber 24, absorbers 30 formed into particles by kneading, for instance, activated carbon and a binder are packed. Furthermore, in the canister body 14, in a position corresponding to the first absorption chamber 22, an introducing pipe 32 connected to a fuel tank that is not shown in the drawing is disposed. Still furthermore, similarly, in a position corresponding to the first absorption chamber 22, an exhaust pipe 34 connected to a not shown engine is disposed. Furthermore, in a position corresponding to the second absorption chamber 24, an air communicating pipe 36 communicated with air is disposed.

When oil is fed, a vaporized fuel gas is generated in a fuel tank. The vaporized fuel gas is introduced through the introducing pipe 32 into the canister 12. A vaporized fuel component of the introduced vaporized fuel gas is absorbed by the absorbers 30 and cleansed air is released through the air communicating pipe 36 into air. Furthermore, while a vehicle is running, the vaporized fuel component absorbed by the absorber 30 is desorbed and transported, together with air introduced through the air communicating pipe 36, from the exhaust pipe 34 to the engine.

Inside of the first absorption chamber 22, a heat storage material container 38 is provided. In the heat storage material container 38, a heat storage material higher in the thermal conductivity and larger in the heat capacity than that of the absorber 30 is accommodated. As the heat storage material, although a material that is a solid at a normal temperature such as metal such as iron and copper and inorganic materials such as ceramics and glass may be used, a material that is liquid at normal temperature may be used as well. As an example of the embodiment, hexadecane is used.

Furthermore, the heat storage material container 38 as well is constituted of a material higher in the thermal conductivity than that of the absorber 30 and the heat capacity (a product of the specific heat and the mass) as well is set larger. In particular, in the embodiment, outside of the accommodated heat storage material, a closed curved surface is formed; accordingly, the heat storage material does not at all come into contact with the absorber 30.

Figure 2A:
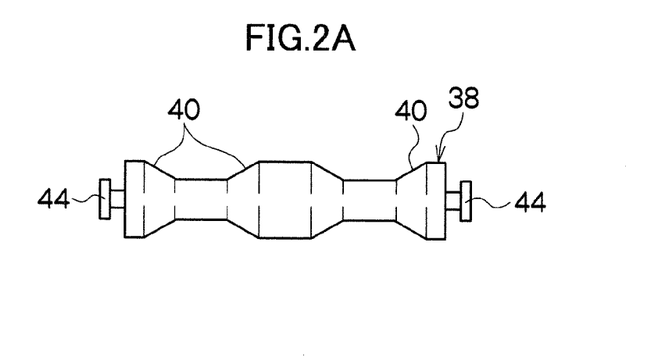
FIGS. 2A, 2B and 2C show a heat storage material container disposed inside of the canister of the first embodiment of the invention, FIG. 2A being a plan view, FIG. 2B being a front view and FIG. 2C being a side view.
Figure 2B:
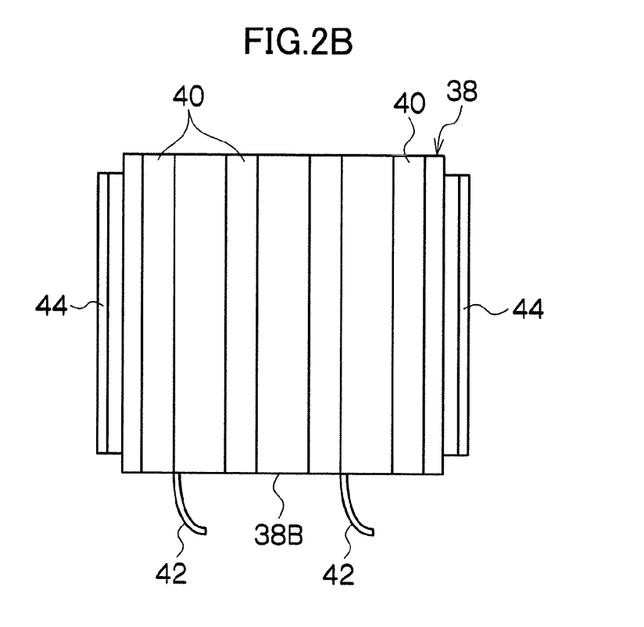
Figure 2C:
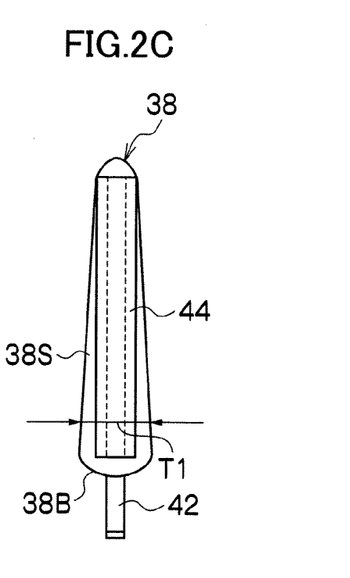

As detailed as well in FIGS. 2A through 2C, an entire shape of the heat storage material container 38 is substantially planar. However, a shape (a shape of a side surface 38S) when the heat storage material container 38 is viewed from a side surface thereof is formed into an wedge shape where a thickness T1 gradually decreases from the other end wall 14B side of the canister body 14 to one end wall 14A side thereof Thereby, the resistance in a flow direction F1 (a downward flow in FIG. 1) in the first absorption chamber 22 of the vaporized fuel gas introduced from a fuel tank through the introducing pipe 32 becomes smaller.

At front and back surfaces of the heat storage material container 38, one piece or a plurality of pieces of beads 40 (3 pieces in the embodiment) is formed in parallel with flow directions F1 and F2 of the vaporized fuel gas in the canister body 14. The beads 40 increase a surface area of the heat storage material container 38 and thereby the thermal conductivity of the heat storage material container 38 is heightened. Furthermore, the beads 40 are formed in parallel with flow directions F1 and F2 in the first absorption chamber 22, that is, the beads 40 are formed so as not to generate inadvertent resistance in a flow of the vaporized fuel gas.

From a lower end 38B of the heat storage material container 38, one sheet or a plurality of sheets of rectification (current adjustment) plates 42 is extended. The rectification plate 42 is formed into a shape curved along a flow direction of the vaporized fuel gas between the first absorption chamber 22 and the space 28 to regulate the vaporized fuel gas.

Figure 3:
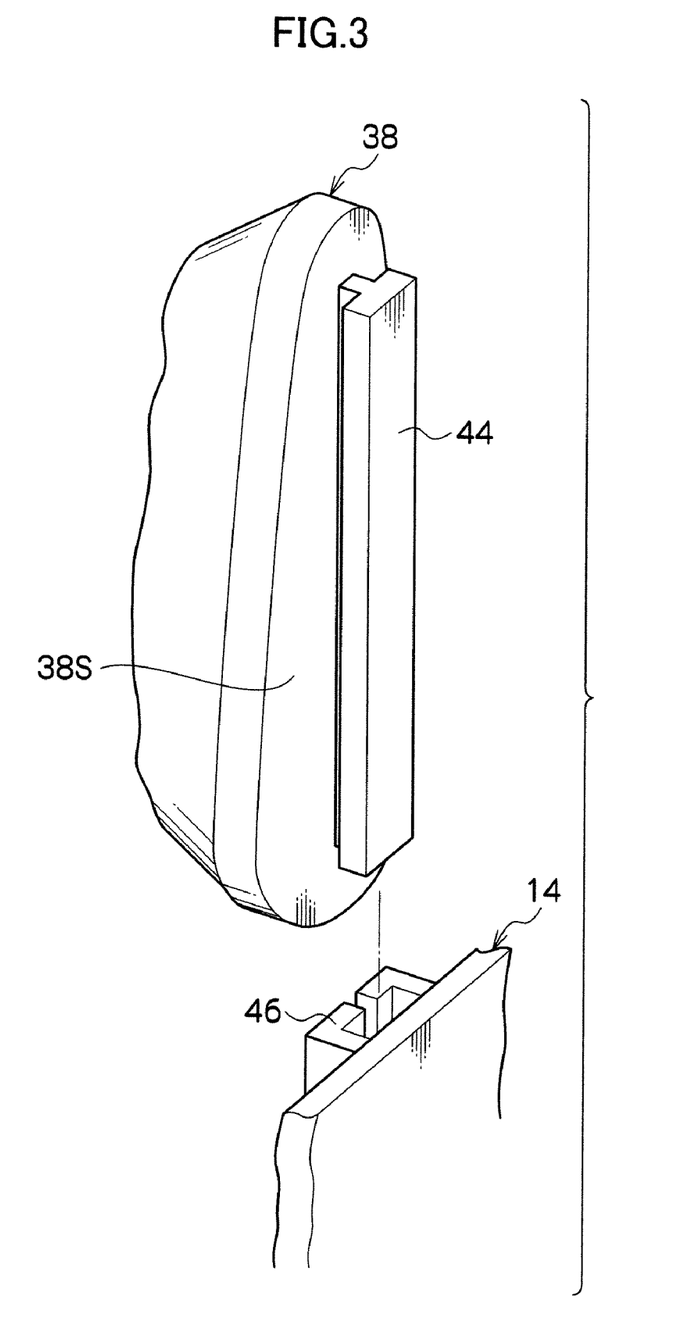
FIG. 3 is a perspective view partially showing a heat storage material container disposed inside of the canister of the first embodiment of the invention and a canister body.

As shown in FIG. 3, on a side surface 38S of the heat storage material container 38, an engaging projection 44 formed in a T character shape when viewed from an upper direction is formed in an up and down direction. On the other hand, the canister body 14 is provided with an engaging groove 46 with which the engaging projection 44 is engaged. When the engaging projection 44 is engaged with the engaging groove 46, the heat storage material container 38 is positioned and fixed to the canister body 14. Furthermore, the canister body 14 is reinforced with the heat storage material container 38. The engaging groove 46 may be formed on a side surface 14S or a partition wall 20 that forms the first absorption chamber 22 of the canister body 14. Alternatively, a wall member may be formed newly in the canister body 14 and an engaging groove 46 may be formed on a wall member thereof Furthermore, the heat storage material container 38 is constituted of a material (in the embodiment, as an example, nylon) whose melting temperature is lower than the boiling temperature of the accommodated heat storage material. Accordingly, when the heat storage material container 38 inside of which the heat storage material is accommodated is heated, in the beginning, the heat storage material container 38 is melted and the heat storage material is vaporized by water.

The heat storage material container 38 may be disposed only one in the first absorption chamber 22. However, for instance, a plurality of heat storage material containers 38 may be disposed with a predetermined distance separated in a thickness direction thereof to improve the heat storage effect.

In the next place, an operation of the embodiment will be described.

In the canister 12 of the embodiment, as mentioned above, a vaporized fuel component of a vaporized fuel gas introduced through an introducing pipe 32 at the time of oil feeding is absorbed by the absorber 30 and cleansed air is released into air through the air communicating pipe 36. Furthermore, when a vehicle is running, the vaporized fuel component absorbed by the absorber 30 is desorbed and transported, together with air introduced through the air communicating pipe 36, from the exhaust pipe 34 to the engine.

In general, in the absorber 30 that contains activated carbon, at the time of absorption of the vaporized fuel gas, a temperature increases to deteriorate the absorption capacity and at the time of desorption the temperature decreases to deteriorate the desorption capacity. However, in the embodiment, inside of the first absorption chamber 22, a heat storage material accommodated in the heat storage material container 38 is present. Accordingly, at the time of absorption, the heat is transferred from the absorber 30 to the heat storage material container 38 and the heat storage material to inhibit a temperature of the absorber 30 from increasing. Furthermore, at the time of desorption, the heat is transferred from the heat storage material and the heat storage material container 38 to the absorber 30 to inhibit the temperature of the absorber 30 from decreasing. Thereby, performance deterioration resulting from temperature variation of the absorber 30 can be prevented.

Furthermore, in the embodiment, the heat storage material is accommodated in the heat storage material container 38 that constitutes a closed curved surface; accordingly, the heat storage material is isolated from the absorber 30, that is, these are completely in a non-contact state. In comparison with a configuration where the heat storage material surrounds the absorber 30 to be in contact, a contact area of the absorber 30 with the vaporized fuel gas and air can be secured larger; accordingly, the absorption capacity and the desorption capacity of the absorber 30 can be highly exerted. Still furthermore, since the heat storage material does not come into contact with the vaporized fuel gas and air, the performance thereof can be prevented from deteriorating.

In particular, in the embodiment, the heat storage material container 38 is constituted of a material higher in the thermal conductivity than that of the absorber 30. Thereby, in the heat exchange rate between the absorber 30 and the heat storage material, the heat exchange rate between the absorbers 30 becomes rate-determining (limiting condition, bottle-neck). Accordingly, in comparison with one that is constituted of a material having the thermal conductivity lower than that of the absorber 30, the heat exchange rate becomes higher and thereby an efficient heat exchange can be realized.

Furthermore, in the embodiment, the heat storage material container 38 has the heat capacity larger than that of the absorber 30. Accordingly, in comparison with a configuration where the heat storage material container 38 is not provided (in place of the heat storage material container 38, in this region as well, the absorber 30 is present), the heat capacity becomes larger; accordingly, the temperature of the absorber 30 can be effectively prevented from increasing or decreasing.

In addition thereto, in the embodiment, as shown in FIGS. 2A, 2B and 2C, the heat storage material container 38 is provided with beads 40. Thereby, in comparison with a configuration where such beads 40 are not provided, a contact area with the absorber 30 is secured larger. Accordingly, the thermal conductivity between the absorber 30 and the heat storage material container 38 and the heat storage material becomes higher and thereby the absorber 30 can be effectively prevented from increasing or decreasing in the temperature.

A direction of the bead 40, as far as a contact area with the absorber 30 can be secured larger, is not particularly restricted. However, in particular in the embodiment, the beads 40 are formed along flow directions F1 and F2 of the vaporized fuel gas and air in the first absorption chamber 22; accordingly, in comparison with a configuration where, for instance, the beads are formed in a direction that intersects with the flow direction, the ventilation resistance due to the beads 40 is prevented from increasing.

Moreover, in the embodiment, as shown in FIGS. 2C and 3, a shape viewed from a side surface is formed into a wedge shape where a thickness T1 gradually decreases from the other end wall 14B side to one end wall side 14A side of the canister body 14. Thereby, the resistance in flow directions F1 and F2 in the canister body 14 of the vaporized fuel gas introduced from the fuel tank through the introducing pipe 32 is made smaller. In particular, when fuel is fed into the fuel tank, owing to ascendance of a liquid surface in the fuel tank, much vaporized fuel gas is generated. However, even in such a case, the vaporized fuel gas is smoothly introduced into the canister body 14.

Figure 4:
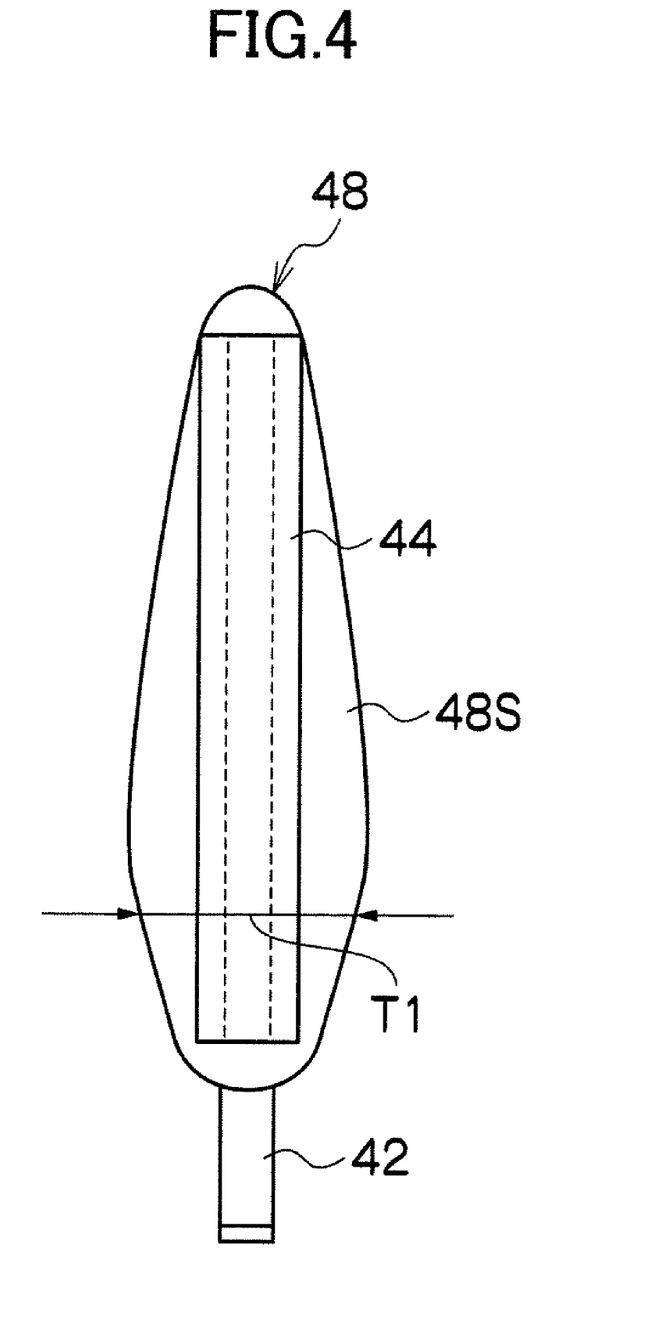
FIG. 4 is a side view showing an example different from FIGS. 2A, 2B and 2C of a heat storage material container disposed inside of the canister of the first embodiment of the invention.

Thus, in order that the resistance in flow directions F1 and F2 in the canister body 14 of the vaporized fuel gas introduced from the fuel tank through the introducing pipe 32 is made smaller, it is not necessarily for a thickness T1 to decrease gradually in an entirety of the side surface 38S. For instance, as in a heat storage material container 48 shown in FIG. 4, a thickness T1 of the side surface 48S may gradually decrease upward from an intermediate portion thereof in a height direction.

Furthermore, in the embodiment, from a lower end 38B of the heat storage material container 38, a rectification plate 42 formed curved along a flow direction of the vaporized fuel gas between the first absorption chamber 22 and the space 28 is extended. Thereby, the vaporized fuel gas can be regulated to realize a smooth flow in the canister body 14.

Still furthermore, in the embodiment, the engaging projection 44 on a side surface 38S of the heat storage material container 38 is engaged with the engaging groove 46 of the canister body 14 to fix the heat storage material container 38 in a positioned state with respect to the canister body 14 to thereby reinforce the canister body 14. In particular, in comparison with a configuration where a member is disposed to reinforce, the reinforcement can be achieved with a simple structure and without causing an increase in weight. It goes without saying that, as far as the heat storage material container 38 can be assuredly fastened to the canister body 14 and the canister body 14 can be reinforced by the heat storage material container 38, a structure by which the heat storage material container 38 and the canister body 14 are engaged is not restricted thereto.

The heat storage material container 38 involving the embodiment can be processed by incineration. In the embodiment, since a melting temperature of the heat storage material container 38 is lower than the boiling temperature of the heat storage material, before, upon heating, the heat storage material becomes a gas from a liquid to rapidly raise internal pressure of the heat storage material container 38, the heat storage material container 38 is melted. Accordingly, at the time of heating, the heat storage material container 38 can be prevented from exploding.

Thus, in order to inhibit the heat storage material container 38 from exploding upon heating, there is no need of an entirety of the heat storage material container 38 being constituted of a material lower in the melting temperature than the boiling temperature of the heat storage material to form a melting portion involving the invention. That is, the heat storage material container 38 may be at least partially constituted of a material lower in the melting temperature than the boiling temperature of the heat storage material to be a melting portion involving the invention. For instance, a plurality of constituent elements of the heat storage material container may be bonded to form a heat storage material container 38. In the case, as a joining material, one of which melting temperature is lower than the boiling temperature of the heat storage material may be used. In the configuration, as an example of a material of the constituent element of the heat storage material container, metal such as copper can be cited and as an example of a joining material for instance solder can be cited.

Furthermore, with a hole provided to the heat storage material container, the hole may be clogged with a stopper member. In the case, as the stopper member, one that has the melting temperature lower than the boiling temperature of the heat storage material may be used. In the configuration, as an example of a material of the heat storage material container as well, metal such as copper can be cited, and as an example of the stopper member, for instance, solder can be cited as well.

Figure 5:
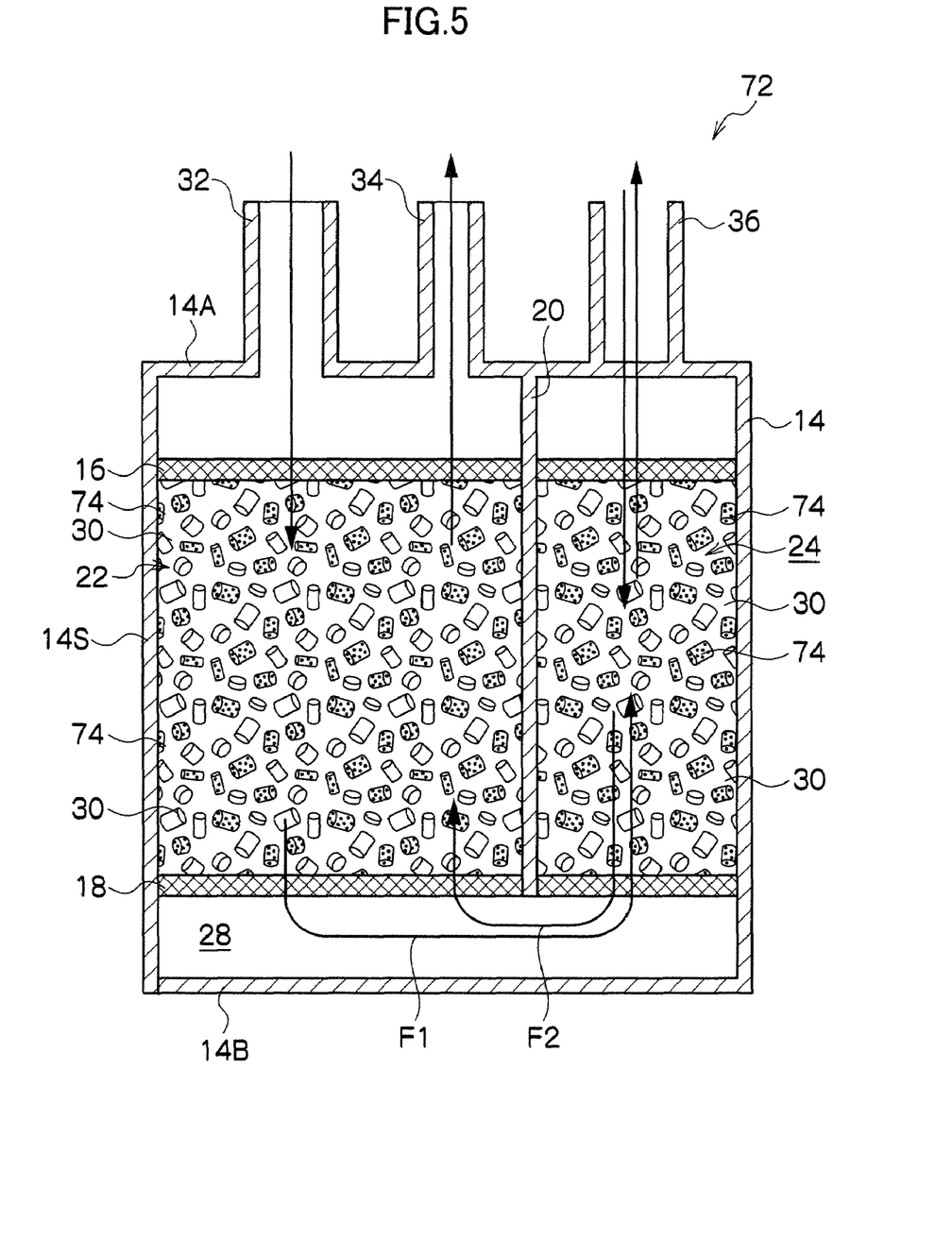
FIG. 5 is a sectional view showing a schematic configuration of a canister of a second embodiment of the invention.

In FIG. 5, a canister 72 of a second embodiment of the invention is shown. In the following, constituent elements and members that are the same as those in the first embodiment are provided with same reference numerals, and detailed descriptions thereof will be omitted.

A canister 72 of the second embodiment is not provided with the heat storage material container 38 involving the first embodiment. However, in place thereof, a heat storage material container 74 formed into a shape ("equivalent" shape) that is the same as that of the absorber 30 is used. As detailed in FIG. 6 as well, although an exterior view of the heat storage material container 74 is formed into a shape same as that of the absorber 30, inside thereof, the heat storage material same as that of the first embodiment is accommodated. Furthermore, combined specific gravity of the heat storage material container 74 and the heat storage material is set to be equivalent to that of the absorber 30.

Figure 6:
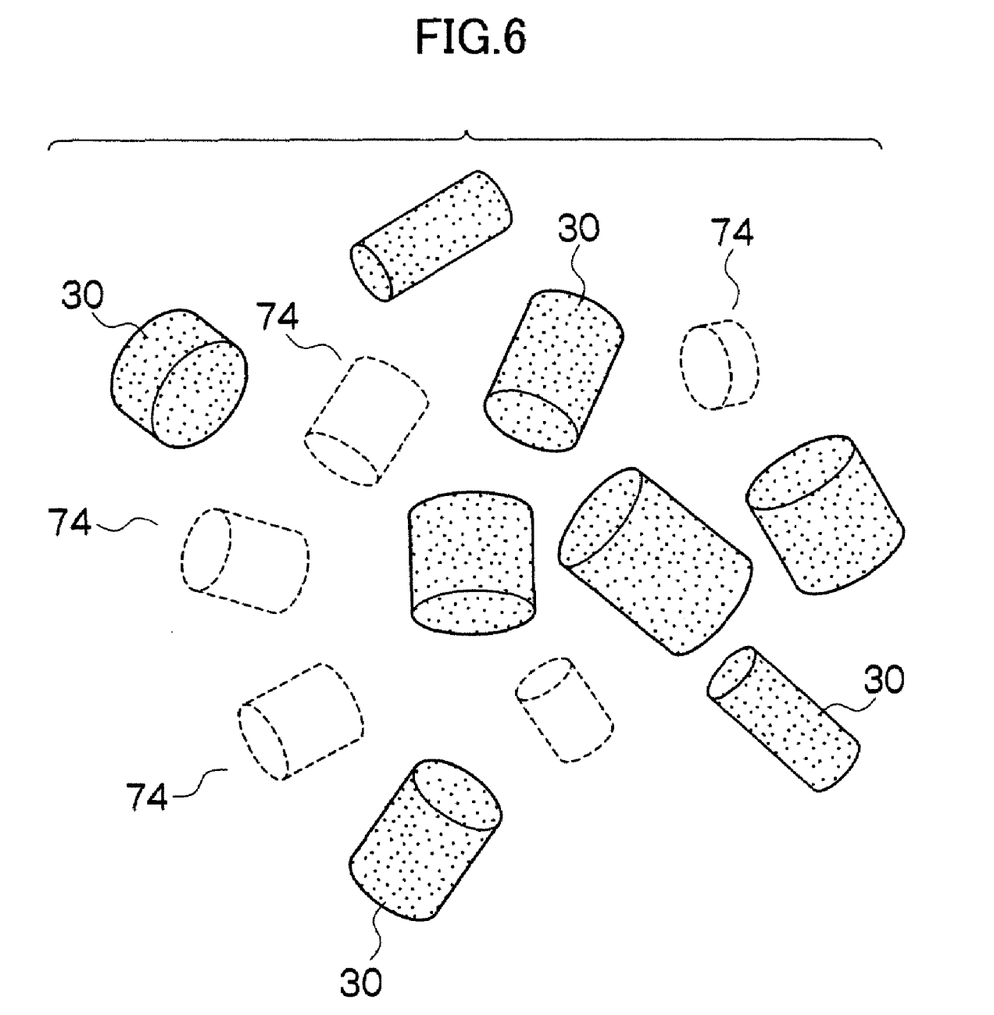
FIG. 6 is an explanatory diagram showing a state of absorbers and heat storage material containers mingled in the canister of the second embodiment of the invention.

Accordingly, in the second embodiment, over an entire region of the canister body 14, the heat storage material containers 74 (heat storage material) can be evenly disposed. That is, over an entire region of the canister body 14, a heat storage effect (suppression of temperature increase or temperature-down of the absorber 30) due to the heat storage material can be obtained. In particular, since the shape of the heat storage material container 74 is formed same as that of the absorber 30, a local irregularity in the canister body 14 is difficult to occur. Furthermore, since the combined specific gravity of the heat storage material container 74 and the heat storage material is set to be equivalent to that of the absorber 30, even when vibration is repeatedly applied to the canister body 14, irregular distribution of the heat storage material containers 74 can be prevented from occurring.

In the next place, since the heat storage material is isolated from the absorber 30 to be in a non-contact state from each other, a contact area of the absorber 30 with the vaporized fuel gas and air can be secured larger and thereby the absorption capacity and desorption capacity of the absorber 30 can be exerted highly. Furthermore, the heat storage material as well is prevented from coming into contact with the vaporized fuel gas and air to result in inhibiting the performance from deteriorating.

Still furthermore, when the absorbers 30 and the heat storage material containers 74 are packed in the canister body 14 as well, after the absorbers 30 and the heat storage material containers 74 are mixed in advance outside of the canister body 14, these can be packed in the canister body 14, that is, a packing operation can be readily applied.

In the second embodiment, an external view of the heat storage material container 74 and that of the absorber 30 having the "equal shape" includes the "equality" to an extent by which the heat storage material containers 74 and the absorbers 30 can be evenly mixed. Actually, since the absorbers 30 also fluctuate in individual shapes thereof, if there is dispersion of the shape of the heat storage material containers 74 at least within this range of the fluctuation, this is included in the "equivalent shape". Even when the dispersion of shapes of the heat storage material containers 74 exceeds an extent of the dispersion of shapes of the absorbers 30, it is sufficient as long as these can be mixed without substantial irregularity.

Similarly, that the combined specific gravity of the heat storage material containers 74 and the heat storage material is "equivalent" to that of the absorber 30 means that, as long as these do not cause irregularity due to the vibration acting on the canister body 14, such a case is also included.

What is claimed is:

1. A canister, comprising:
    a canister body in which vaporized fuel gas is introduced;
    an absorber that is accommodated in the canister body and absorbs the vaporized fuel gas;
    a heat storage material container disposed inside of the canister body; and
    a heat storage material accommodated in the heat storage material container, the heat storage material container has a substantially planar shape that forms a closed curved surface outside of the accommodated heat storage material, and is arranged so that the resistance in a flow direction of the vaporized fuel gas becomes smaller.

2. The canister of claim 1, wherein the heat storage material container has a thermal conductivity higher than that of the absorber.

3. The canister of claim 1, wherein the heat storage material container has a heat capacity larger than that of an amount of the absorber corresponding to a volume that the heat storage material container occupies.

4. The canister of claim 1, wherein the heat storage material container includes at least a portion thereof a melting portion that melts at a temperature lower than the boiling temperature of the heat storage container.

5. The canister of claim 1, wherein the heat storage material includes hexadecane.

6. The canister of claim 1, wherein the heat storage material container is fixed in the canister and provided with a sidewall on which a bead is formed along a direction in which the vaporized fuel gas flows in the canister.

* * * * *